3,718,651
Patented Feb. 27, 1973

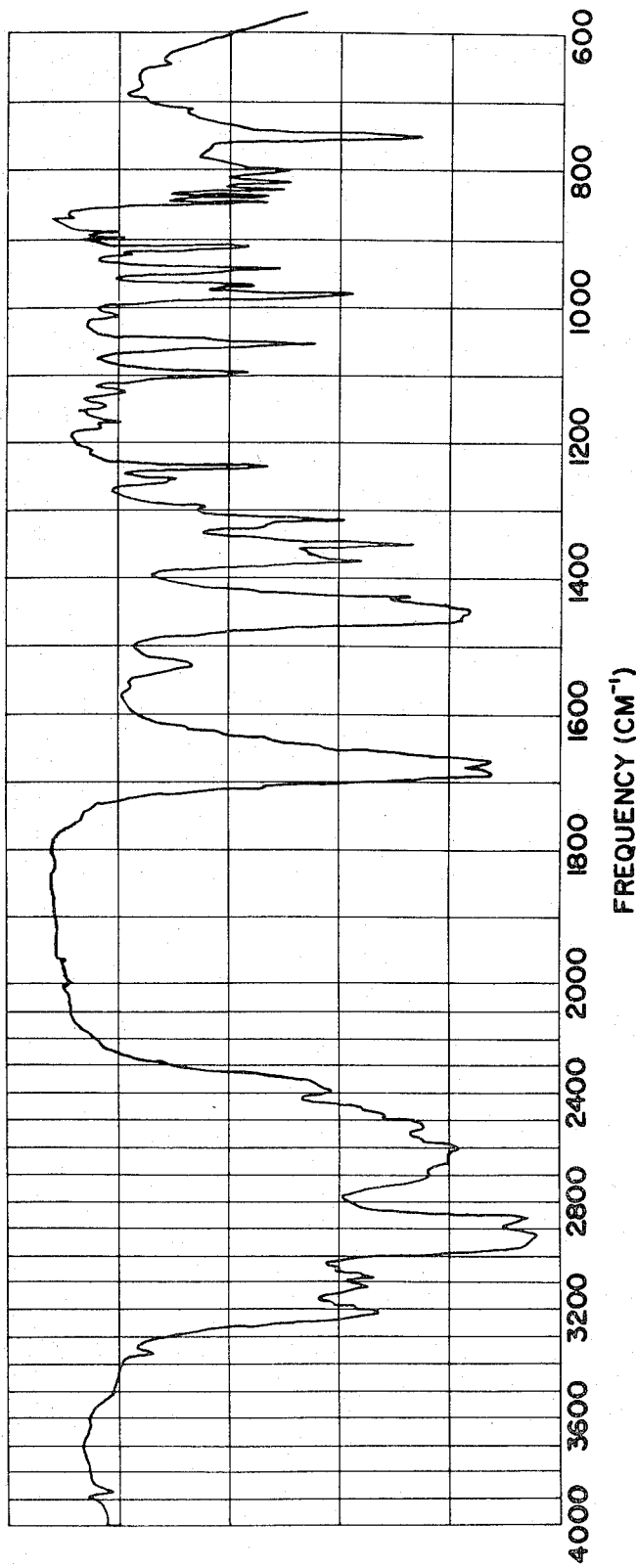

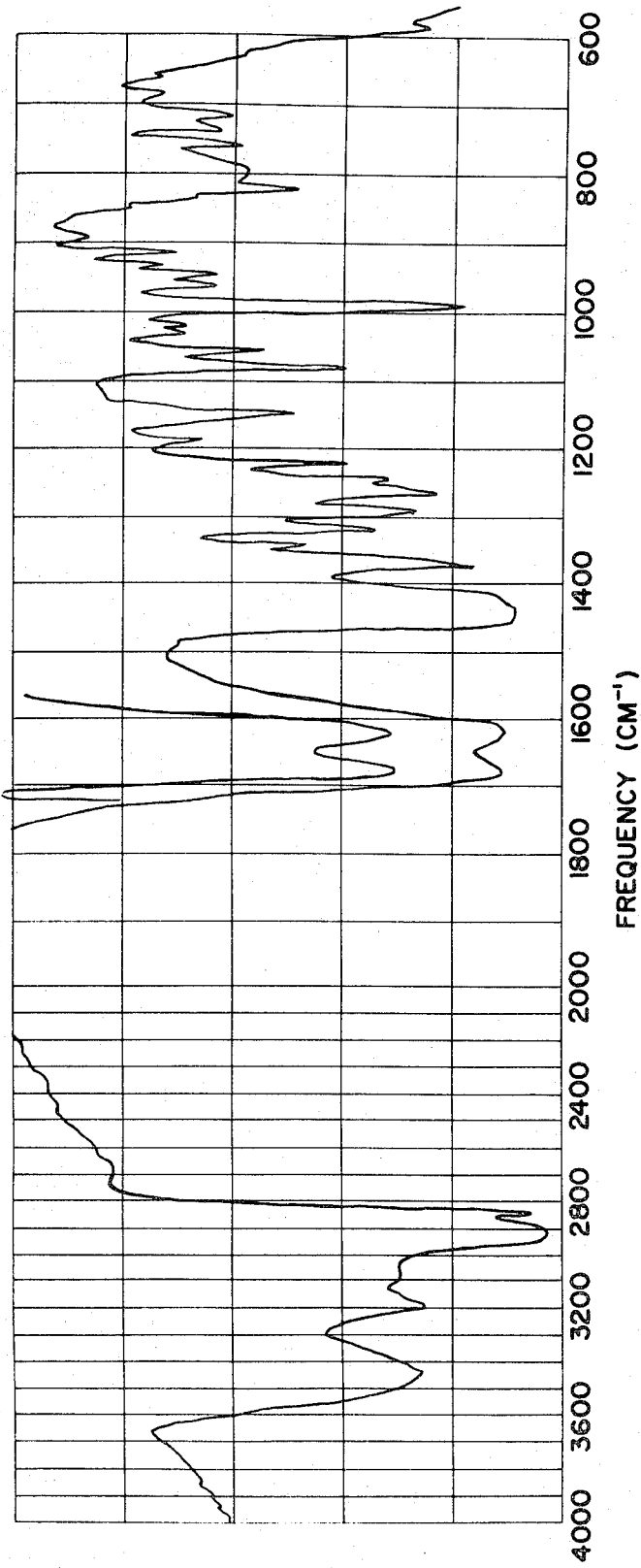

3,718,651
3,6-BIS (5-CHLORO-2-PIPERIDINYL)-2,5-PIPER-AZINE-DIONE

Charles O. Gitterman, Cranford, John Madas, Clark, Edward L. Rickes, Rahway, and Thomas H. Stoudt, Westfield, N.J., assignors to Merck & Co., Inc., Rahway, N.J.
Continuation-in-part of application Ser. No. 834,534, June 18, 1969. This application Nov. 23, 1970, Ser. No. 91,644
Int. Cl. C07d 51/72
U.S. Cl. 260—268 DK          4 Claims

ABSTRACT OF THE DISCLOSURE 3,6-bis(5 - chloro-2-piperidinyl) - 2,5 - piperazinedione, also known as Compound 593A, is obtained by fermentation of a heretofore unknown species of *Streptomyces griseoluteus*. Compound 593A has demonstrated activity in inhibiting the growth of tumors in mammals and birds, and in inhibiting the growth of certain microorganisms.

CROSS-REFERENCES TO RELATED APPLICATIONS

This application is a continuation-in-part of U.S. Ser. No. 834,534, filed June 18, 1969, now abandoned.

BACKGROUND OF THE INVENTION

The discovery that effective therapeutic agents could be obtained as products resulting from bacterial fermentation has immeasurably increased the armamentarium necessary to maintain the healthy state or to reverse the diseased state. As witness to this is the discovery of penicillin, streptomycin, and also certain anti-tumor agents resulting from microbial fermentation. Unfortunately, because of the widespread use and sometimes misuse of these valuable substances it has been found that certain strains of some pathogens develop a resistance to a particular chemotherapeutic agent, and as a result, the selected agent is no longer active against such resistant strains. This, coupled with the fact that there are still many pathogenic organisms known, and other unknown disease factors for which there is no truly effective agent, has continued to stimulate great interest in this field.

SUMMARY OF THE INVENTION

This invention relates to valuable new chemical substances and processes for their preparation. More particularly, it is concerned with a new basic substance and acid salts thereof having valuable antibacterial and antitumor activity; the new basic substance, 2,6-bis(5-chloro-2-piperidinyl)-2,5-piperazinedione, hereinafter also called Compound 593A, having the structural formula:

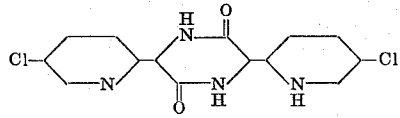

being produced by growing a heretofore unknown species of *Streptomyces griseoluteus* in suitable fermentation mediums.

It is an object of this invention to provide 3,6-bis(5-chloro-2-piperidinyl)-2,5-piperazinedione and its acid salts. Another object is to provide methods for preparing 3,6-bis(5-chloro - 2 - piperidinyl)-2,5-piperazinedione by fermentation, methods for recovering this substance from fermentation broths, and methods of preparing acid salts of 3,6-bis(5-chloro - 2 - piperidinyl)-2,5-piperazinedione. Other objects will be apparent from the detailed description hereinafter provided.

DESCRIPTION OF THE PREFERRED EMBODIMENTS 3,6-bis(5 - chloro - 2 - piperidinyl)-2,5-piperazinedione, the new substance of the present invention, is formed by growing under controlled conditions a previously unknown stain of microorganism. The original microorganism which was isolated from soil collected in the geographical area of Richmond, Union of South Africa, has been designated as MA–1241 in the culture collection of Merck & Co., Inc., Rahway, N.J. The parent culture, MA–1241, has also been deposited in the culture collection of the Northern Utilization Research and Development Branch of the U.S. Department of Agriculture at Peoria, Ill., where it is available as NRRL 3412.

The orginal isolate of the 3,6-bis(5-chloro-2-piperidinyl)-2,5-piperazinedione producing culture, obtained as a single colony from soil, was plated onto a sterilized agar plate of the following composition:

|   | G. |
|---|---|
| Agar | 20 |
| Yeast extract | 10 |
| Glucose | 10 |
| $MgSO_4 \cdot 7H_2O$ | 0.5 |
| $KH_2PO_4$ | 1.82 |
| $Na_2HPO_4$ | 1.90 |

Distilled water, 1 liter.

After incubating the slant at 28° C., the resulting growth was used to inoculate a 250 ml. shake flask containing 50 ml. of a sterilized medium of the following composition:

|   | G. |
|---|---|
| Beef extract | 3 |
| N–Z amine | 10 |
| Glucose | 10 |
| NaCl | 5 |

Distilled water, 1 liter.
pH 7.2 before sterilization.

After 48 hours incubation on a rotary shaker at 28° C., the vegetative inoculum was used to inoculate a 250 ml. shake flask containing the following sterilized medium:

|   | G. |
|---|---|
| Glucose | 10 |
| Peptone | 5 |
| Yeast extract | 3 |
| NaCl | 12.705 |
| KCl | 0.72 |
| $FeSO_4(NH_4)_2SO_4 \cdot 6H_2O$ | 0.35 |
| $MgCl_2 \cdot 2H_2O$ | 5.32 |
| $CaCl_2 \cdot 2H_2O$ | 0.728 |

Distilled water, 1 liter.
Adjust pH 7.4 before sterilization.

After an additional 48 hours incubation period at 28° C. on a shaker, a sample of the resulting filtered broth was assayed and found to have antibiotic and antitumor activity. In spite of the many tests performed, the compound isolated could not be identified with a known substance and was therefore designated as 3,6-bis(5-chloro-2-piperidinyl)-2,5-piperazinedione.

A sample of the parent culture was preserved by lyophilization and stocked in sterilized tubes to insure a source of the culture for future work.

CLASSIFICATION

In an attempt to classify the organism producing 3,6-bis(5-chloro-2-piperidinyl)-2,5 - piperazinedione, samples were grown from the stable lyophilized parent culture and the morphological and physiological characteristics examined and compared to known organisms. From this study it was found that the parent culturem most closely resembled *Streptomyces griseoluteus* and, accordingly, these 3,6-bis(5-chloro-2-piperidinyl)-2,5-piperazinedione producing cultures have been assigned the species designation *Streptomyces griseoluteus*.

The characteristics of the parent isolate are shown in Table I in comparison with the two most closely related organisms, *Streptomyces griseoluteus* and *Streptomyces aureofaciens*. The descriptions of the known latter organisms are as reported in Bergey's "Manual of Determinative Bacteriology," 7th edition (1957) and in Waksman's, "The Actinomycetes," vol. 2 (1961). All of the readings in the table were taken after three weeks' incubation at 28° C. unless noted otherwise, and the pH of the media used in these studies was about 6.8 to 7.2. The colors used in the description are in accordance with the definitions of "The Color Harmony Manual," 4th edition (1958).

The following descriptions of the microorganisms producing 3,6 - bis(5-chloro - 2 - piperidinyl)-2,5-piperazinedione are given as illustrative of suitable strains of *Streptomyces griseoluteus*, which can be used in the production of 3,6 - bis(5 - chloro - 2-piperidinyl)-2,5-piperazinedione, but it is to be understood that the present invention is not to be limited to organisms answering these particular descriptions. The present invention also contemplates the use of other strains of *Streptomyces griseoluteus* either isolated from nature or obtained by mutation of these organisms such as those obtained by natural selection or those produced by mutuating agents.

CULTURAL CHARACTERISTICS OF MA-1241 (593A) AND THE TWO MOST CLOSELY RELATED ORGANISMS

|  | 593A | *Streptomyces griseoluteus* | | *Streptomyces aureofaciens* | |
|---|---|---|---|---|---|
|  |  | Waksman | Bergey | Waksman | Bergey |
| Morphology | Sporophores appear as flexuous chains, hooks and loops. Spores appear oval to cylindrical (950X) in chains of 8-10 (avg.). Avg. size 1.2 x 1.7μ. | Sporophores with monopodial and irregular branching, flexible and hooked. Spores oval to cylindrical, 1.0 to 1.2 by 1.8 to 2.2μ. | Aerial mycelium: hyphae branch monopodially and irregularly; coridia ellipsoidal to cylindrical, 1.0 to 1.2 by 1.8 to 2.2 microns. | Sporophores monopodially branches, flexuous, producing open spirals. Spores spherical to oval, smooth. | Aerial mycelium: white, becoming brownish gray to dark drab-gray in 5-10 days. Sporophores straight, flexuous; no spirals. Spores spherical to ellipsoidal, longest diameter 1.5 microns. Vegetative. See note. |
| Czapek Dox agar (sucrose nitrate) agar. | Growth moderate. Vegetative growth colorless. Reverse colorless. Aerial mycelium sparse, white. No soluble pigment. | Growth thin, colorless to cream-colored. Margin plumose, penetrating into medium. Aerial mycelium powdery, grayish-white to light drab. Soluble pigment absent or yellowish-brown. |  | Substrate growth only. Occasionally faint brownish pigment produced. |  |
| Glycerol aspargine agar | Growth moderate. Vegetative growth light brown. Reverse light brown. Aerial mycelium very sparse, whitish. Very light brown soluble pigment. |  |  |  |  |
| Synthetic agar |  |  | Thin, colorless to cream-colored growth. Margin plumose, penetrating into medium. Aerial mycelium powdery, grayish white to light drab. No soluble pigment or a yellowish brown pigment. |  |  |
| Glucose-aspargine agar |  |  |  |  |  |
| Glucose-aspargine meat extract agar. |  | Growth wrinkled, cream-colored. Aerial mycelium thin, white. Pigment reddish-brown. |  | Growth hyaline, changing to orange-yellow or purplish-brown. Aerial mycelium, if present, white changing to ash-gray or dark gray with tawny reverse. Faint, yellowish soluble pigment occasionally discernible. |  |
| Glucose agar |  |  | Wrinkled, cream-colored growth. Aerial mycelium thin, white. Reddish-brown pigment. |  |  |
| Tomato paste-oatmeal agar | Growth good. Vegetative growth light brown. Reverse light brown. Aerial mycelium sparse, white. Medium brown soluble pigment. |  |  |  | Hyaline growth changing to orange-yellow. Aerial mycelium abundant, white, changing to deep gray or dark gray with tawny reverse. Faint yellowish pigment. |
| Emerson's agar | Growth good. Vegetative growth brown. Reverse brown. No aerial mycelium. Very light brown soluble pigment. |  |  |  |  |
| Agar |  |  | Wrinkled, transparent growth. Aerial mycelium thin, white, powdery. No soluble pigment or a yellowish-brownish pigment. |  | Good, light brownish growth. No aerial mycelium. No soluble pigment. |

CULTURAL CHARACTERISTICS OF MA-1241 (593A) AND THE TWO MOST CLOSELY RELATED ORGANISMS

| | 593A | Streptomyces griseoluteus Waksman | Streptomyces griseoluteus Bergey | Streptomyces aureofaciens Waksman | Streptomyces aureofaciens Bergey |
|---|---|---|---|---|---|
| Nutrient agar | Growth light to moderate. Vegetative growth colorless. No aerial mycelium. No soluble pigment. | Growth wrinkled, transparent. Aerial mycelium thin, white, powdery. Soluble pigment absent or yellowish-brown. | | Growth good translucent to brownish. No aerial mycelium. No soluble pigment. Melanin-negative. | |
| Calcium malate agar | Vegetative growth light yellowish-brown. Aerial mycelium sparse, white. No soluble pigment. Hydrolysis. | | | | |
| Skim milk agar | Growth good. Vegetative growth light brown. No aerial mycelium. Melanin-negative. | | | | |
| Peptone-iron yeast extract slant | Negative | | | | |
| Production of H₂S | Growth moderate. Vegetative growth colorless. No aerial mycelium. No browning of medium. | Mostly negative | | | |
| Tyrosine agar | Growth moderate. Colonies light to medium brown. No aerial mycelium. No soluble pigment. | Growth abundant, wrinkled, cream-colored. Aerial mycelium dusty white, thin. Plug becoming slightly brownish. | Abundant, wrinkled, cream-colored growth. Aerial mycelium dusty white, thin. Plug becoming slightly brownish. | Growth lichenoid, light orange-yellow to brown-red to purplish. No aerial mycelium. Color of plug unchanged. | Wrinkled orange-yellow growth. Color of plug unchanged. |
| Potato plug | Growth good. Vegetative growth wrinkled, light yellowish-brown. No aerial mycelium. No soluble pigment. Hydrolysis. | Hydrolysis | Starch is hydrolyzed | | |
| Starch agar | Nitrites produced from nitrates | Positive. Surface ring cream-colored. Aerial mycelium in form of white patches. | Nitrites produced from nitrates. Cream-colored ring; white surface patches. | | |
| Reduction of Milk | No visible growth. Coagulation. Acid reaction (pH 5.0). | | | Growth limited, yellow-brown surface. Coagulation and peptonization variable (often none, occasionally present). | Limited yellow-brown growth. No coagulation or peptonization. |
| Skim milk | No visible growth. Coagulation. Acid reaction. | | | | |
| Litmus milk | Good growth at 28° C. No growth at 50° C. | | | | |
| Temperature | (Yeast extract-dextrose stab). Good surface growth and along ¼ of stab line. | | | | |
| Micro-aerophilic growth | No growth on first test. With heavier inoculum liquefaction was complete after 3 weeks. Surface growth only. No soluble pigment. | No growth | No growth | Cream-colored surface ring. Liquefaction none to limited. No soluble pigment. | No liquefaction. |
| Gelatin stab | Growth good. Vegetative growth wrinkled, light yellowish-brown. No aerial mycelium. No soluble pigment. Liquefaction. | | | | |
| Nutrient gelatin plates | | | Cream-colored to brown surface ring. Aerial mycelium powdery, white. Soluble reddish-brown pigment weakly produced. | | |
| Glucose broth | | | | | |
| Carbohydrate utilization: | | | | | |
| Glucose | + (light brown soluble pigment) | | | | |
| Fructose | ++ (medium brown soluble pigment) | | | | |
| Rhamnose | ++ (medium brown soluble pigment) | | | | |
| Xylose | ++ (medium brown soluble pigment) | | | | |
| Mannose | ++ (medium brown soluble pigment) | | | | |
| Arabinose | ± (very light brown soluble pigment) | | | | |
| Inositol | | | | | |
| Mannitol | | | | | |
| Lactose | | | | | |
| Raffinose | | | | | |
| Sucrose | | | | | |

The new product of this invention may be produced by either surface or submerged cultures; however, it is presently preferred to carry out the fermentation in the submerged state. Small scale fermentation batches may be conveniently prepared by placing suitable quantities of nutrient medium in flasks, sterilizing the flasks and contents by heating to about 120° C. for twenty minutes, inoculating the flasks with vegetative cultures of a 3,6-bis(5-chloro-2-piperidinyl) - 2,5 - piperazinedione producing strain of *Streptomyces griseoluteus,* loosely sealing the flasks with cotton and allowing fermentation to proceed on a shaker in a constant room at 28° C. for 3–5 days. Larger fermentation batches may be prepared, using suitably sized tanks provided with an agitator and a means of aerating the fermentation medium. In this method the medium and tanks containing the sterilized medium is inoculated with a vegetative culture. The fermentation is allowed to proceed from 2–4 days with constant agitation or aeration of the nutrient medium at a constant temperature of about 28° C. In carrying out the fermentation according to this process it may be desirable to add a small amount of a suitable anti-foaming agent. Suitable agents may include soybean oil, castor oil, 1% octadecanol in mineral oil, or a polymerized propylene glycol such as polyglycol 2,000. These agents will thus control any excess foaming that may occur in the fermentation broth during fermentation.

Aqueous media, such as those employed for the production of antibiotics, are suitable for producing 3,6-bis(5-chloro-2-piperidinyl)-2,5-piperazinedione. Such media contain sources of carbon and nitrogen assimilable by the microorganism and inorganic salts. In addition, the fermentation media contain traces of metals necessary for the growth of the microorganism which are commonly supplied as impurities incidental to the addition of other constituents of the medium.

In general, carbohydrates such as sugars, for example, glucose, maltose, fructose, and the like, and starches such as grains, for example, oats and rye, corn starch, corn meal, and the like, can be used either alone or in combination as sources of assimilable carbon in the nutrient medium. The exact quantity of the carbohydrate source or sources utilized in the medium will depend in part upon the other ingredients of the medium, but it is usually found that an amount of carbohydrate between about 1 and 6% by weight of the medium is satisfactory. These carbon sources can be used individually or several such carbon sources may be combined in the medium.

Satisfactory nitrogen sources include myriad proteinaceous materials such as various forms of hydrolysates of casein, soybean meal, corn steep liquor, distilled solubles, yeast hydrolysates, and the like. The various sources of nitrogen, either alone or in combination, are used in amounts ranging from about 0.2–6% by weight of the aqueous medium.

3,6-bis(5-chloro-2-piperidinyl)-2,5-piperazinedione can be recovered from the broth by filtering and concentrating the filtrate under vacuum to about ⅒ the original volume and then subjecting the concentrated broths to extractive procedures.

For example, 3,6-bis(5-chloro-2-piperidinyl)-2,5-piperazinedione can be recovered from the broth or a concentrate thereof by extraction with a water immiscible solvent for the product such as butanol or chloroform. When the broth is extracted at pH 7, the free base is obtained. Alternatively, the broth can be evaporated to dryness and extracted with a suitable solvent such as a lower alkanol, for example methanol or ethanol.

Purer forms of the 3,6-bis(5-chloro-2-piperidinyl)-2,5-piperazinedione can be obtained by repeated recrystallization from hot methanol. Another procedure which can be utilized comprises absorbing the compound on anion exchange resins with polylalkylamine groups attached to a styrene-divinylbenzene polymer lattice. The absorbed antibiotic is readily eluted from the resin absorbate with water. Evaporation of the eluate to dryness affords 3,6-bis(5-chloro-2-piperidinyl)-2,5-piperazinedione which can be further purified by fractional recrystallization from methanol.

Alternatively, 3,6-bis(5-chloro-2-piperidinyl)-2,5-piperazinedione can be purified by absorption on basic alumina or silia gel and then eluted with ethylacetate or methanol.

The preferred procedure for purifying 3,6-bis(5-chloro-2-piperidinyl)-2,5-piperazinedione is as follows: (A) One part of 3,6-bis(5-chloro-2-piperidinyl)-2,5-piperazinedione is dissolved in water, filtered, and cooled in an ice bath before adjusting the pH to 7 with aqueous base. The resultant precipitate is collected and washed first with water and then with methanol and dried at room temperature in vacuo to afford the free base dihydrate of approximately 95% purity. (B) One part of the dried material is added to methanol and warmed on a steam bath. While the solution is still warm additional methanol containing excess hydrochloride gas is added and the resulting precipitate is collected. After washing with methanol and ether the precipitate is dried at room temperature in vacuo. (C) One part of the dried material is dissolved in water and the above Procedures (A) and (B) are repeated to afford a product of approximately 98% or greater purity. (D) One part of product thus obtained is warmed in methanol and the procedure from (B) to (C) is repeated again to afford an analytical sample corresponding to the formula $C_{14}H_{22}N_4Cl_2O \cdot 2HCl$.

ASSAY 3,6-bis(5-chloro-2-piperidinyl)-2,5-piperazinedione may be conveniently assayed for anti-tumor activity using the Human Tumor-Egg Host System or the KB Cell Culture System. In assaying 3,6-bis(5-chloro-2-piperidinyl)-2,5-piperazinedione by the Human Tumor-Egg Host System, tumor implants of human adenocarcinoma (H.AD. 1) are placed on the chorioallantoic membranes of nine-day embryonated eggs. The eggs are incubated 3–4 days, and those showing positive "takes" are selected for the test. 3,6-bis(5-chloro-2-piperidinyl)-2,5-piperazinedione is then injected into the yolk sac of the egg. Seven days after injection, the eggs are harvested and tumors and embryos from treated and untreated control groups are weighed and the percent growth inhibition of the tumor and embryo in the treated egg is obtained as follows:

Ten tumor implanted eggs are sacrificed at the time of injection with 3,6-bis(5-chloro-2-piperidinyl)-2,5-piperazinedione to determine mean weight of the tumor. The value obtained is then subtracted from the mean weight obtained from the treated and untreated control tumors at the time of the harvest to determine the actual increase in weight of the tumors during the treatment period. The percent growth retardation for treated eggs is obtained by comparing the increase in weight of treated tumors with the increase in weight of untreated control tumors using the formula $(100 - T/C \times 100)$. The percent growth retardation for embryos is determined in a similar manner.

In testing 3,6-bis(5 - chloro - 2 - piperidinyl)-2,5-piperazinedione for anti-tumor activity according to the KB cell culture system, Eagle's KB cells (human epidermoid carcinoma cells) are grown on glass in milk dilution bottles, each containing 20 ml. of Eagle's basal medium plus 10 percent calf serum. Each bottle receives $8 \times 10^5$ cells. The medium is renewed on the third and sixth day. On the seventh day the cells are harvested with the aid of trypsin, centrifuged, and suspended in Eagle's medium plus 5 percent calf serum. The volume of medium is adjusted so that each ml. of the suspension contains $1.5 \times 10^4$ cells. The cell suspension is distributed in 2.0 ml. amounts into 16 x 125 mm. test tubes to which agents under test in volumes up to 0.2 ml. have been added. Control tubes are similarly prepared with test agents omitted. The tubes are incubated in an upright position in a 5 percent $CO_2$-95 percent air atmosphere at 37° C. The resultant cell sheet which forms at the bottom of the tube is examined microscopically after five days' incubation. The growth in the treated tubes is compared with the growth in the control tubes and the cytotoxic $ED_{50}$ (dose which inhibits cell growth 50%) is estimated for each test agent.

When 3,6 - bis(5 - chloro-2-piperidinyl)-2,5-piperazinedione was tested against H.AD. 1 at various test levels and the resultant percent inhibitory values were graphed, the dose which inhibited tumor growth 60% ($ED_{60}$) was 17 μg./egg. This compares very favorably with other antitumor agents when tested according to the same procedure. The following chart illustrates this:

| Antitumor agent: | $ED_{60}$, μg./egg |
|---|---|
| 3,6 - bis( - 5 - chloro - 2 - piperidinyl)-2,5 - piperazinedione | 17 |
| Azaserine | 1000 |
| Hadacidin | 3000–7000 |
| Hydroxyurea | 20,000 |
| 6 - mercaptopurine | 8,000 |
| Methyl mitomycin | 10–130 |
| Nitrogen mustard | 250 |
| Streptonigrin | 3–4 |
| Sodium tenuazonate | 150–420 |
| Triethylenemelamine | 3–12 |

In accordance with the antibotic activity mentioned below, 3,6-bis(5-chloro-2-piperidinyl)-2,5-piperazinedione and its salts are useful antimicrobial agents. For example, they can be used to remove susceptible microorganisms from pharmaceutical equipment and the like, or to separate certain microorganisms from solutions containing mixtures of several microorganisms.

Also, as indicated above, 3,6-bis(5-chloro-2-piperidinyl)-2,5-piperazinedione and its salts possess potent anti-tumor activity and are convenient reference compounds for the testing of other compounds for this activity.

When 3,6 - bis(5 - chloro-2-piperidinyl)-2,5-piperazinedione was tested against KB cells, the cytotoxic $ED_{50}$ was found to be from 0.03–0.1 μg.ml'

In addition to the anti-tumor activity exhibited by 3,6-bis(5 - chloro - 2 - piperidinyl)-2,5-piperazinedione, it also exhibits antibiotic activity when tested against *Proteus vulgaris* MB–838, *Vibrio percolans* MB–1272, *Psuedomonas stutzeria* MB–1231, and *Brucella bronchiseptica* MB–965.

When 3,6-bis(5-chloro-2-piperidinyl)-2,5-piperazine is used to reduce tumor growth, it may be administered to the host orally or parenterally. As with most drugs having similar activity, the dose administered cannot be rigidly fixed. Accordingly, dosage is best determined by initiating treatment at a low level such as about 0.5 to 2 mg. per kilogram of body weight per day and the dose increased by 10–50% per day or every other day provided no untoward reactions have been noted. Thus, the examination of vital body functions and particularly blood studies are necessary in establishing the total dose to be administered.

Properties of 3,6-bis(5-chloro-2-piperidinyl)-2,5-piperazinedione 3,6 - bis(5 - chloro - 2 - piperidinyl)-2,5-piperazinedione is a basic substance forming acid salts. Thus, the free base, which can be extracted from the broth at pH 7 on reactions with inorganic or organic acids forms the corresponding acid salt such as the hydrochloride, sulfate, acetate, propionate, and the like.

It contains the elements carbon, hydrogen, nitrogen, oxygen and chlorine. A typical analysis of the hydrochloride salt showed it to contain 40.06% carbon, 5.79% hydrogen, 13.27% nitrogen, 8.50% oxygen and 33.39% chlorine. This analysis indicated the molecular formula to be $C_{14}H_{22}N_4O_2Cl_2 \cdot 2HCl$. The hydrochloride salt does not melt below 330° C.

The infrared spectrum of the hydrochloride salt of 3,6-bis(5-chloro-2-piperidinyl)-2,5-piperazinedione in a mineral oil (Nujol) mull is shown in FIG. 1. The NMR spectral characteristics in $D_2O$ are summarized in the following table.

| $\tau$ [a]: | Relative no.H |
|---|---|
| 5.42 (d.) (J=2.5) | 1 |
| 5.82 (m.) | 1 |
| 6.2 (m.) | 1 |
| 6.4 (m.) | 1 |
| 6.81 (t.) (J=12) | 1 |
| 7.53 (m.) | 1 |
| 7.82 (m.) | 1 |
| 8.1 (m.) | 1 |
| 8.3 (m.) | 1 |

[a] Relative to internal DSS.

When 3,6 - bis(5 - chloro-2-piperidinyl)-2,5-piperazinedione (free base) is reacted with acetic anhydride in the presence of pyridine at temperatures from 0° C. to room temperature, an acetylated derivative or acetate is obtained melting at 228°–229° C. with decomposition. The infrared spectrum in a mineral oil (Nujol) mull of this acetate after crystallization from methanol is shown in FIG. 2.

3,6 - bis(5 - chloro-2-piperidinyl)-2,5-piperazinedione is soluble in water, lower alkanols such as methanol, ethanol and butanol, and chloroform. The free base has low solubility in water at pH 7 but dissolves when heated. The product is soluble in aqueous acid solutions at pH 2, forming the acid salt.

The free base may be converted to a hydrochloride salt by acidifying a methanolic solution containing the free base with a lower alkanoic (preferably methanolic) solution of hydrogen chloride. 3,6-bis(5-chloro-2-piperidinyl)-2,5-piperazinedione is stable at room temperature for 24 hours in aqueous solution at pH 2 and 10. It is labile after 3–5 minutes at 100° C. at pH 7 aqueous solution. It has been found that at 50–60° C. the degradation proceeds slowly, some free base still being detectable after 3 hours. Acid hyldrolysis (6 NCl 16 hours at 100° C.) leads to complete degradation.

EXAMPLE 1

Fermentation of 3,6-bis(5-chloro-2-piperidinyl)-2,5-piperazinedione

A lyophilized culture of 3,6 - bis(5 - chloro-2-piperidinyl) - 2,5-piperazinedione (*Streptomyces griseoluteus* NRRL 3412) was suspended in 2 ml. of a medium consisting of Y.E.D. plus salts (FB) and used to inoculate slants containing the same media plus 2% agar. The slants were then incubated at 28° C. for five days or until well sporulated.

To the sporulated slant was added 10 ml. of a medium having a pH of 7 to 7.2 and consisting of

| | Percent |
|---|---|
| Dextrose | 1 |
| N–Z amine | 1 |
| NaCl | 0.5 |
| Meat extract | 0.3 |
| Distilled water, q.s., ad. | | and the growth on the slant was scraped into the suspension and used to inoculate a 250 ml. baffled Erlenmeyer flask containing 50 ml. of the same medium. The inoculated flask was then placed on a rotary shaker and incubated at 28° C. for 72 hours or until good vegetative growth was obtained.

An inoculum of 10 ml. of the resulting vegetative growth was then used to inoculate a 2 l. baffled Erlenmeyer flask containing 500 ml. of sterilized medium of the same composition as shown above, and the inoculated flask was then placed on a rotary shaker and incubated for 72–96 hours at 28° C. or until good vegetative growth was obtained.

The resulting fermentation broth was used to inoculate a 50-gallon stainless steel fermentor containing 160 l. of the medium of the same composition shown above. The inoculated medium was incubated at 28° C. with agitation at 150 r.p.m. while maintaining an air flow of 3 c.f.m. through the fermentation broth. During the 72–96 hour fermentation period, small amounts of an antifoamant (Polyglycol 2,000) was added to control foaming of the batch.

8.3% of the resulting broth was then used to inoculate a 200-gallon stainless steel fermentor containing 440 l. of a medium having a pH of from 7 to 7.2 and having the following composition:

|  | G./l. |
|---|---|
| Dextrose | 10.0 |
| Peptone | 5.0 |
| NaCl | 12.7 |
| Yeast extract | 3.0 |
| KCl | 0.72 |
| $FeSO_4(NH_4)_2SO_4 \cdot 6H_2O$ | 0.035 |
| $MgCl \cdot 6H_2O$ | 5.32 |
| $CaCl_2 \cdot 2H_2O$ | 0.728 |
| Distilled water, q.s., ad |  |

The inoculum was incubated for 120 to 160 hours with agitation at 130 r.p.m. while maintaining an air flow of 10 c.f.m. through the broth, a defoamer being added if necessary.

EXAMPLE 2

Filtered broth (100 gal.) obtained by the fermentation procedure described in Example 1 above was filtered and concentrated in vacuo to approximately 16 gallons and a 5-gallon portion of the concentrated broth was lyophilized.

EXAMPLE 2A

Recovery of 3,6 - bis(5 - chloro-2-piperidinyl)-2,5-piperazinedione from broth by extraction with N-butanol at pH 2

5 gal. of the above obtained concentrated broth were adjusted to pH 2 with hydrochloric acid and extracted 5 times with 3 gal. of wet butanol. The butanol extracts were then combined and concentrated free of butanol.

The acidic aqueous residue obtained from the butanol extraction above was adjusted to a pH of 10 with sodium hydroxide and extracted 5 times with 3 gal. of butanol. The butanol extracts were then combined and concentrated in vacuo free of butanol. The resulting concentrated alkaline solution was the adjusted to a pH of 7, lyophilized and assayed for anti-tumor activity. The anti-tumor activity observed was as follows:

KB cytotoxic $ED_{50}$ was found to be between 3–9 $\mu g./ml.$ When tested against H.Ad. 1 at 10 mg. and 5 mg. dose levels per egg, inhibition of the tumor was 80% and 60% respectively.

EXAMPLE 2B

Recovery of 3,6 - bis(5 - chloro-2-piperidinyl)-2,5-piperazinedione by extraction with methanol 25 g. of the above obtained lyophilized broth was extracted with methanol by suspending the lyophilized broth in 125 ml. of methanol and filtering the mixture. The methanol insoluble residue obtained was again suspended in 125 ml. of methanol and filtered, and the combined filtrates containing the methanol soluble extracts were concentrated to an aqueous solution in vacuo and lyophilized. Upon assay of this fraction against H.Ad. 1 at levels of 15 mg., 7.5 mg., and 3.75 mg. per egg, tumor growth was inhibited 85%, 58% and 28%, respectively. The cytotoxic KB cell $ED_{50}$ was found to be slightly greater than 10 $\mu g./ml.$

EXAMPLE 2C

Recovery of 3,6 - bis(5 - chloro-2-piperidinyl)-2,5-piperazinedione by extraction with methanol—conversion to the free base—the hydrochloride and acetate 1 kg. of lyophilized filtered broth representing a lyophilized portion from a 16 gallon concentrated broth obtained in Example 2 was suspended in 5 l. of absolute ethanol. The mixture was then filtered to remove insoluble material and the filtrate subsequently concentrated to an aqueous solution. The concentrated aqueous solution was then diluted to 1 liter with water and the pH adjusted to 7 with sodium hyrroxide. 100 ml. (1/10) of this aqueous solution was lyophilized and, upon assay, the KB cytotoxic $ED_{50}$ was found to be 10 $\mu g./ml.$; at a level of 5 mg./egg, H.Ad. 1 tumor growth was inhibited 78% and at 1.7 mg./egg. 64%. The remaining 900 ml. of the solution was extracted with 6×900 ml. of butanol.

The first 900 ml. extract was concentrated in vacuo to water and the crystalline fraction which was observed removed by filtration, diluted with water, and lyophilized. Assay of the lyophilized sample showed a KB cytotoxic $ED_{50}$ of 0.1–0.3 $\mu g./ml.$ H.Ad. 1 tumor growth was inhibited 68% and 23% at doses of 50 and 25 $\mu g./egg,$ respectively.

The insoluble residue from the initial ethanol extraction was extracted with 2500 ml. of absolute ethanol. The ethanol soluble fraction after filtration was concentrated in vacuo to a small volume. A crystalline fraction was observed salting out and removed by centrifugation, suspended in water and lyophilized.

A small amount of the crystalline fraction obtained was mixed with about 5 ml. water and about 10 ml. of methanol and concentrated to dryness after adding about 10 ml. of methanol two times. The final solids were then dissolved in 25–35 ml. of absolute methanol and allowed to stand at room temperature for 12 hours after which a small amout of crystalline material separated out. The sample was then cooled to 45° C. for four days and the resulting crystalline fraction was removed by centrifugation and dried in vacuo. The crystalline material thus obtained decomposed at 330° C. leaving a brown residue.

This crystalline fraction exhibited a cytotoxic $ED_{50}$ value of 0.01 to 0.02 $\mu g./ml.$ and inhibited the growth of the H.Ad. 1 tumor 84% at 33 $\mu g./egg$ and 82% at 11 $\mu g./egg.$ The mother liquors were concentrated to a low volume to remove a second crop of solids having a KB cytotoxic $ED_{50}$ value of .03 $\mu g./ml.$ 80 mg. of crystalline sample was dissolved in N/10 hydrochloric acid, then neutralized slowly with N/10 sodium hydroxide to convert it to the free base. A precipitate formed at about pH 7. It was collected in a centrifuge tube and dried in vacuo to yield 54 mg. of 3,6-bis(5 - chloro-2-piperidinyl)-2,5-piperazinedione as the free base.

*Analysis.*—Calculated for $C_{14}H_{22}N_4O_2Cl_2$ (percent): Cl, 20.3. Found (percent): Cl, 19.07.

The free base thus obtained was dissolved in methanol, a trace of insoluble impurity was separated and the solution was acidified by addition of alcoholic hydrogen chloride. The solvent was evaporated at reduced pressure to a small volume. On standing, while crystals of the hydrochloride formed. The crystals were purified by recrystallization from methanol and dried in vacuo. No melting point was observed below 330° C.

*Analysis.*—Calcd. for $C_{14}H_{22}N_4O_2Cl_2 \cdot 2HCl$ (percent): C, 39.8; H, 5.74; N, 13.25; O, 7.59; Cl, 33.5. Found (percent): C, 40.23; H, 5.85; N, 12.76; O, 8.5 Cl, 32.82.

Biological Assay in eggs against H.Ad. 1 Tumor

| Dose, $\mu g./egg$ | Deaths | Growth inhibitions, percent | |
|---|---|---|---|
|  |  | Embryo | Tumor |
| 50 | 1/8 | 12 | 102 |
| 25 | 0/8 | −3 | 83 |
| 12.5 | 0/8 | −23 | 46 |
| 6.25 | 1/8 | −8 | −29 |

From the above data the estimated $ED_{60}$ against H.Ad. 1 was 17 $\mu g./egg.$ I.R. spectrum: See FIG. 1.

The acetate of 3,6-bis(5-chloro-2-piperidinyl)-2,5-piperazinedione was prepared by treating 8 mg. of the free base with 2 ml. of acetic anhydride and 2 drops of pyridine at room temperature for 5 hours. The excess reagent was evaporated at reduced pressure and the acetyl derivative was then crystallized from aqueous methanol as stout blades, melting at 228–229° C. with decomposition.

I.R. spectrum: See FIG. 2.

EXAMPLE 2D

Extraction of 3,6-bis(5-chloro-2-piperidinyl)-2,5-piperazinedione with butanol at pH 7

A 50 g. portion of the lyophilized broth obtained above was dissolved in 250 ml. of water at a pH of 7 and extracted 5 times with 250 ml. of butanol, as described in Example 2A. The combined extracts were concentrated in vacuo to an aqueous solution which was centrifuged. The insoluble fraction which separated out was redissolved in water and lyophilized which when assayed was found to have an $ED_{50}$ against KB cells of slightly less than 0.3 µg./ml.

EXAMPLE 3

Direct ethanol extraction (free base) of 3,6-bis(5-chloro-2-piperidinyl)-2,5-piperazinedione from broth 4,685 g. of lyophilized broth obtained according to the procedure of Example 1 was extracted with absolute ethanol by suspending the lyophilized material in 30 l. of absolute ethanol. The ethanolic mixture was then filtered to remove insoluble material, and the filtrate concentrated to a low volume. A crystalline fraction which was observed in the concentrated filtrate was separated by filtration and the crystals obtained were washed with ethanol and dried in vacuo. The resulting crystalline material was active against KB cells at 0.1 to 0.3 µg./ml.

341 mg. of the crystalline material obtained was dissolved in 2.5 ml. of water at a pH of 2 and filtered. The acid insoluble residue was discarded and the filtrate obtained was adjusted to pH 8.0 with sodium bicarbonate. The resulting crystalline fraction observed was filtered off and the crystals were washed with acetone and ether and dried in vacuo. Upon assay, the crystalline material (free base) exhibited a KB $ED_{50}$ value of 0.3 µg./ml. and against H.Ad. 1, tumor growth was inhibited 71 and 84% by doses of 50 and 25 µg./egg, respectively.

51.9 mg. of this crystalline material was recrystallized by dissolving it in 17 ml. of hot methanol and the resulting solution concentrated to 1.2 ml. The resulting crystalline fraction was filtered off, washed with ethyl ether and dried in vacuo. Activities of this fraction were found to be as follows:

(a) Against KB cells, $ED_{50}$ of 0.03–0.1 µg./ml.
(b) Against H.Ad. 1, growth inhibited 77 and 58% by doses of 50 and 25 µg./egg.

EXAMPLE 4

Chloroform extraction of 3,6-bis(5-chloro-2-piperidinyl)-2,5-piperazinedione from broth 18 l. of filtered broth derived from fermentation by 3,6-bis(5-chloro-2-piperidinyl)-2,5-piperazinedione, prepared according to the procedure set forth in Example 1, was adjusted to pH 3.5 and extracted three times with 6 l. portions of chloroform.

A total of 5 kg. of sodium chloride was dissolved in the extract broth solution (the aqueous phase obtained from the above chloroform extraction). The pH was adjusted to 10 with ammonium hydroxide and extracted with 5×9 l. portions of chloroform. The $ED_{50}$ activity of each chloroform soluble extract against KB cells was found to be about 0.3 µg./ml. Treating a methanolic solution of the third extract with methanolic hydrogen chloride yielded 140 mg. of white crystals (as the hydrochloride salt) which exhibited an activity ($ED_{50}$) of less than 0.3 µg./ml. against KB cells.

1 g. of the above second extract was dissolved in 5 ml. of chloroform, diluted with 2 ml. of ethyl acetate and this solution was passed through a ¾ inch x 5½ inch column of Brockman basic alumina (slurried in ethyl acetate). Eluting the column with 250 ml. of ethyl acetate removed all the color and yielded 192 mg. of gum, which upon assay, showed a KB cytotoxic $ED_{50}$ of 0.3 µg./ml. Eluting the column with 250 ml. of methanol yielded 737 mg. of gum exhibiting a KB cytotoxic $ED_{50}$ of slightly less than 0.03 µg./ml. Converting this fraction to the hydrochloride yielded 123 mg. of white crystals with activity against KB cells ranging from 0.03 to 0.1 µg./ml.

When 1 g. of the gum from the first chloroform extract was dissolved in 5 ml. of chloroform and diluted with 2 ml. of ethyl acetate, it was passed through a ¾ inch x 2½ inch column of silica gel (slurried in ethyl acetate). Eluting the column with 250 ml. of ethyl acetate yielded 245 mg. of gum showing activity at slightly less than 0.3 µg./ml. against KB cells. Converting this fraction to the hydrochloride salt yielded 193 mg. of white crystals showing activity of about 0.03 µg./ml.

3,6-bis(5-chloro-2-piperidinyl)-2,5-piperazinedione and its salts can be used to detect the presence of lysogenic viruses in bacterial strains. For this purpose 10–30 γ/ml. of the compound added to a growing culture of the bacteria will cause lysis of the cells containing the lysogenic viruses.

EXAMPLE 5

Purification of 3,6-bis(5-chloro-2-piperidinyl)-2,5-piperazinedione dihydrochloride A 100 g. portion of the hydrochloride salt prepared in Example 2C was dissolved in 15 ml. of water, filtered and cooled in an ice-bath before adjusting the pH to 7 with 1 N sodium hydroxide. The resultant precipitate was collected and washed twice with 10 ml. water and then twice with 5 ml. of methanol. After drying at room temperature in vacuo, 0.745 g. of 3,6-bis(5-chloro-2-piperidinyl)-2,5-piperazinedione dihydrate was obtained.

85 mg. of 3,6-bis(5-chloro-2-piperidinyl)-2,5-piperazinedione dihydrate was warmed in 3 ml. of methanol with stirring. While the solution was still warm, 2 ml. of methanol containing excess hydrogen chloride gas was added with stirring. The resulting precipitate was stirred and collected. After washing four times with 1 ml. of methanol and once with 1½ ml. of ether, the precipitate was dried at room temperature in vacuo to afford 77 mg. of 3,6-bis(5-chloro-2-piperidinyl)-2,5-piperazinedione dihydrochloride salt.

77 mg. of the dihydrochloride salt was dissolved in 1.5 ml. of water, filtered and cooled in an ice-bath and the pH adjusted to 7 with 1 N sodium hydroxide. The resultant precipitate was washed six times with 1 ml. of water and two times with 0.5 ml. methanol and dried in vacuo to afford 55 mg. 3,6-bis(5-chloro-2-piperidinyl))-2,5-piperazinedione dihydrate.

55 mg. of the dihydrate was warmed in 3 ml. of methanol with stirring. While the solution was still warm, 2 ml. of methanol containing excess hydrogen chloride gas was added with stirring. The resulting precipitate was collected, washed three times with 0.5 ml. methanol then once with 1 ml. of ether and dried in vacuo to afford 48 mg. of 3,6-bis(5-chloro-2-piperidinyl)-2,5-piperazinedione dihydrochloride.

*Analysis.*—Calcd. for $C_{14}H_{22}N_4Cl_2O_2 \cdot 2HCl$ (422) (percent): C, 39.83; H, 5.74; N, 13.25; Cl, 33.59; O, 7.59. Found (percent): C, 40.06; H, 5.79; N, 13.23; Cl, 33.39; O, 7.53.

What is claimed is:
1. A compound from the group consisting of 3,6-bis-(5-chloro-2-piperidinyl)-2,5-piperazinedione and pharmaceutically acceptable salts thereof.
2. A compound having the formula:

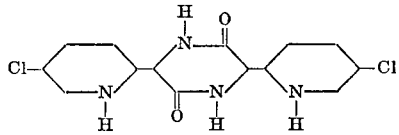

and pharmaceutically acceptable salts thereof.
3. Acid salts of 3,6-bis(5-chloro-2-piperidinyl)-2,5-piperazinedione according to claim 2.
4. The dihydrochloride of 3,6-bis(5-chloro-2-piperidinyl)-2,5-piperazinedione according to claim 2.

References Cited
UNITED STATES PATENTS

| 3,407,203 | 10/1968 | Buidle | 260—268 DK |
| 3,562,253 | 2/1971 | Trown | 260—268 DK |
| 3,560,483 | 2/1971 | Suokos | 260—268 DK |

DONALD G. DAUS, Primary Examiner

U.S. Cl. X.R.

195—50; 424—250